United States Patent
Rosenquest et al.

(10) Patent No.: US 7,410,674 B2
(45) Date of Patent: Aug. 12, 2008

(54) METHOD OF SERVICING AN ELECTRO-DYNAMIC APPARATUS

(75) Inventors: Kenneth Lee Rosenquest, Erie, PA (US); Rihong Mo, Erie, PA (US)

(73) Assignee: General Electric Company, Schenectady, NY (US)

( * ) Notice: Subject to any disclaimer, the term of this patent is extended or adjusted under 35 U.S.C. 154(b) by 925 days.

(21) Appl. No.: 10/261,135

(22) Filed: Sep. 30, 2002

(65) Prior Publication Data

US 2004/0069859 A1    Apr. 15, 2004

(51) Int. Cl.
*B05D 5/00* (2006.01)

(52) U.S. Cl. .............. 427/421.1; 427/427.3; 427/427.4; 427/427.5; 118/317

(58) Field of Classification Search .............. 427/421.1, 427/427.3, 427.4, 427.5; 118/317; 239/424.5
See application file for complete search history.

(56) References Cited

U.S. PATENT DOCUMENTS

| | | | | |
|---|---|---|---|---|
| 2,349,413 | A | * | 5/1944 | Hemperly ............... 174/110 V |
| 4,291,094 | A | | 9/1981 | Trumble |
| 4,413,200 | A | * | 11/1983 | Fenicle ..................... 310/239 |
| 4,668,139 | A | * | 5/1987 | Ohashi ..................... 409/302 |
| 4,776,082 | A | | 10/1988 | Janzer |
| 4,804,144 | A | | 2/1989 | Denman |
| 4,940,002 | A | | 7/1990 | Bien |
| 5,000,769 | A | | 3/1991 | Raguideau et al. |
| 5,236,128 | A | | 8/1993 | Morita et al. |
| 5,262,241 | A | * | 11/1993 | Huggins ..................... 428/421 |
| 5,358,179 | A | | 10/1994 | Lund et al. |
| 5,387,039 | A | | 2/1995 | Bien |
| 5,438,162 | A | * | 8/1995 | Thompson et al. .......... 174/524 |
| 5,450,321 | A | * | 9/1995 | Crane ......................... 701/35 |
| 5,492,275 | A | | 2/1996 | Crampton |
| 5,639,025 | A | | 6/1997 | Bush |
| 5,642,860 | A | | 7/1997 | Bush et al. |
| 5,667,142 | A | | 9/1997 | Newman |
| 5,713,519 | A | | 2/1998 | Sandison et al. |
| 5,718,383 | A | | 2/1998 | Smith et al. |
| 5,722,153 | A | | 3/1998 | Holmes et al. |
| 5,747,905 | A | * | 5/1998 | Yabushita et al. ............. 310/89 |
| 5,779,156 | A | | 7/1998 | Crampton |
| 5,954,273 | A | | 9/1999 | Ruta et al. |
| 5,983,990 | A | | 11/1999 | Alvarez |
| 6,027,038 | A | | 2/2000 | Frankoski et al. |
| 6,267,062 | B1 | * | 7/2001 | Hamilton, Jr. ............. 105/26.05 |
| 6,892,963 | B1 | * | 5/2005 | Scarpa et al. ............. 239/424.5 |
| 7,029,339 | B2 | * | 4/2006 | Brach et al. .................... 440/6 |

* cited by examiner

*Primary Examiner*—Alain L Bashore
(74) *Attorney, Agent, or Firm*—Robert M. Wawrzyn; David G. Maire; Beusse Wolter Sanks Mora & Maire, P.A.

(57) ABSTRACT

A method of servicing an electro-dynamic apparatus (10) such as a traction motor of a locomotive wherein a degraded surface (52) of electrical insulation (50) in the interior of the apparatus is spray coated with a layer of a sealing material (56). The service is provide without the necessity for removing or disassembling the apparatus by inserting a nozzle (64) of a spraying device (60) through an access opening (42) in the frame head (20) of the apparatus. The sealing material is delivered to the nozzle through a flexible delivery tube (66) having an inner tube (80) defining a passageway (82) for the sealing material and a concentric outer tube (84) defining an annular passageway (86) for compressed air for propelling the sealing material from the nozzle.

17 Claims, 2 Drawing Sheets

METHOD OF SERVICING AN ELECTRO-DYNAMIC APPARATUS

FIELD OF THE INVENTION

This invention relates generally to a method of servicing an electro-dynamic apparatus, and more particularly to a method of servicing a motor or alternator used on a vehicle.

BACKGROUND OF THE INVENTION

Locomotives supplied by the assignee of the present invention include a diesel engine that drives an alternator for producing electrical power. The electrical power from the alternator is conducted to traction motors located beneath a platform of the locomotive. The traction motors drive wheels through a gearbox for propelling the locomotive along the tracks. A similar drive system is used for other off-highway vehicle applications such as for mining vehicles.

FIG. 1 illustrates a portion of the under-platform equipment used in a locomotive including a traction motor 10, gearbox 12 and axle 14. The motor 10 includes a frame 16 assembled from several separate members including a stator housing 18, a connector end plate or frame head 20, and a drive end plate 22. Axially extending through the motor frame 16 is a motor shaft 24 that is connected to a pinion gear 26 within the gearbox 12. The pinion gear 26 drives an axle gear 28 connected to the main axle 14 for powering the drive wheels 30 of the locomotive.

Motor 10 includes a stator portion 32 and a rotor portion 34. The motor 10 is cooled by a flow of cooling air 36 (indicated by arrows) received into the motor 10 through a duct 38. The cooling air 36 is directed through cooling passages 40 formed in the stator portion 32 and the rotor portion 34 and exits the motor 10 through a plurality of windows or access openings 42 formed in the frame head 20. It will be appreciated that other arrangements of the above-described components may be found on various models of locomotives.

The stator portion 32 includes conducting elements 44 such as stator coils for conducting electricity to generate the magnetic field for powering the motor 10. Other types of electro-dynamic apparatus may include other types of conducting elements, such as the bus rings and associated connectors found on an alternator. The conducting elements 44 include a conductor of electricity encased in insulating material for isolating the electricity from the electrical ground of the motor frame 16. The insulating material may take any of several forms known in the art, such as tape/varnish systems or powder coat systems. Portions 46 of the conducting elements 44 are located within the motor frame 16 proximate the access openings 42 and are thus subject to damage from the impact of debris that is propelled by the wheels 30 and passes through the access openings 42. These portions 46 of the conducting elements 44 are also exposed to the accumulation of moisture and occasionally grease that may escape from the gearbox 12. These accumulations of dirt and moisture on the insulation provide a pathway for electricity causing a phenomenon referred to as "tracking". Small openings may develop through the insulating material to the underlying conductor as a result of the stress of operation, the impact of debris, or the presence of small pinholes produced during the application of a powder coat insulation system. As the insulating material degrades through continued exposure to the elements through the access openings 42, the amount and intensity of tracking will increase, eventually leading to a short circuit between the conducting element 44 and the motor frame 16 and the failure of the motor 10. Such failures are very costly because they degrade or prevent the operation of the locomotive and they necessitate the complete disassembly of the motor 10 for repair.

A similar concern exists for any electro-dynamic apparatus wherein insulated conducting elements are exposed to an environment where dirt and moisture may accumulate on electrical insulation. For example, the alternator of a locomotive is air-cooled and includes conducting elements that are exposed to the flow of cooling air that may be carrying dirt and moisture. Manufacturing porosity and/or surface flaws induced by operating stresses and particle impact may combine with the accumulated dirt and moisture and lead to an increase in tracking and eventual failure of the apparatus.

SUMMARY OF THE INVENTION

Accordingly, a method of preventing or delaying the failure of an electro-dynamic apparatus due to degradation of electrical insulation is needed.

A maintenance service is described herein including: inserting a nozzle through an access opening of a frame of an electro-dynamic apparatus; and directing a spray of a sealing material from the nozzle onto an interior surface of the apparatus. The maintenance service may include: coating an interior surface of the apparatus in a line of sight with the access opening with a direct spray from the nozzle; and coating an interior surface of the apparatus not in a line of sight with the access opening with an over spray from the nozzle. The maintenance service may further include connecting a delivery tube to the nozzle for delivering the sealing material to the nozzle, the delivery tube comprising: a first tube defining a first fluid passage and a second tube having a diameter larger than a diameter of the first tube and surrounding the first tube to define a second fluid passage in an annular space around the first tube; and directing the sealing material to the nozzle through a first of the first fluid passage and the second fluid passage and directing a compressed gas to the outlet nozzle through a second of the first fluid passage and the second fluid passage to direct the spray of sealing material from the nozzle. The sealing material may be a rubberized RTV material.

A maintenance service for a traction motor of a locomotive is described herein as including: providing a spraying device for delivering a spray of a sealing material from a nozzle; inserting the nozzle into an access opening in the traction motor without removing the traction motor from the locomotive; and directing the spray of sealing material from the nozzle onto a surface of electrical insulation of a stator conductor element in an interior of the traction motor.

A maintenance service for an alternator of a locomotive is described herein as including: providing a spraying device for delivering a spray of a sealing material from a nozzle; inserting the nozzle into an access opening in the alternator without removing the alternator from the locomotive; and directing the spray of sealing material from the nozzle onto a surface of electrical insulation of a conductor element in an interior of the alternator.

BRIEF DESCRIPTION OF THE DRAWINGS

These and other advantages of the invention will be more apparent from the following description in view of the drawings that show.

DETAILED DESCRIPTION OF THE INVENTION

The degradation of insulation in an electro-dynamic apparatus such as an DC or AC motor 10 or alternator (not shown) of a locomotive is the result of the exposure of the insulation to its operating environment. High velocity debris may cause impact damage to the insulation, stresses generated by mechanical loads and thermal expansion may cause cracking of the insulation, and the accumulation of dirt and moisture lowers the resistance to the passage of electricity to electrical ground along the surface of the insulation. Once tracking begins along a surface, it will generate heat and will produce an ash that further lowers the level of electrical resistance, thereby compounding the problem. Powder coat insulating systems may be particularly vulnerable to such service-induced damage due to the presence of small pinholes or voids existing within the depth of the insulation.

Access to the interior portions of many electro-dynamic devices is very limited. The motor frame 16 of a locomotive traction motor 10 contains only a limited number of access openings 42 on the frame head 20 providing restricted access to the interior of the motor 10. Similarly, an alternator may have direct line-of-sight access to only a small portion of its stator coils and bus rings through openings in the alternator frame.

Figure 1:
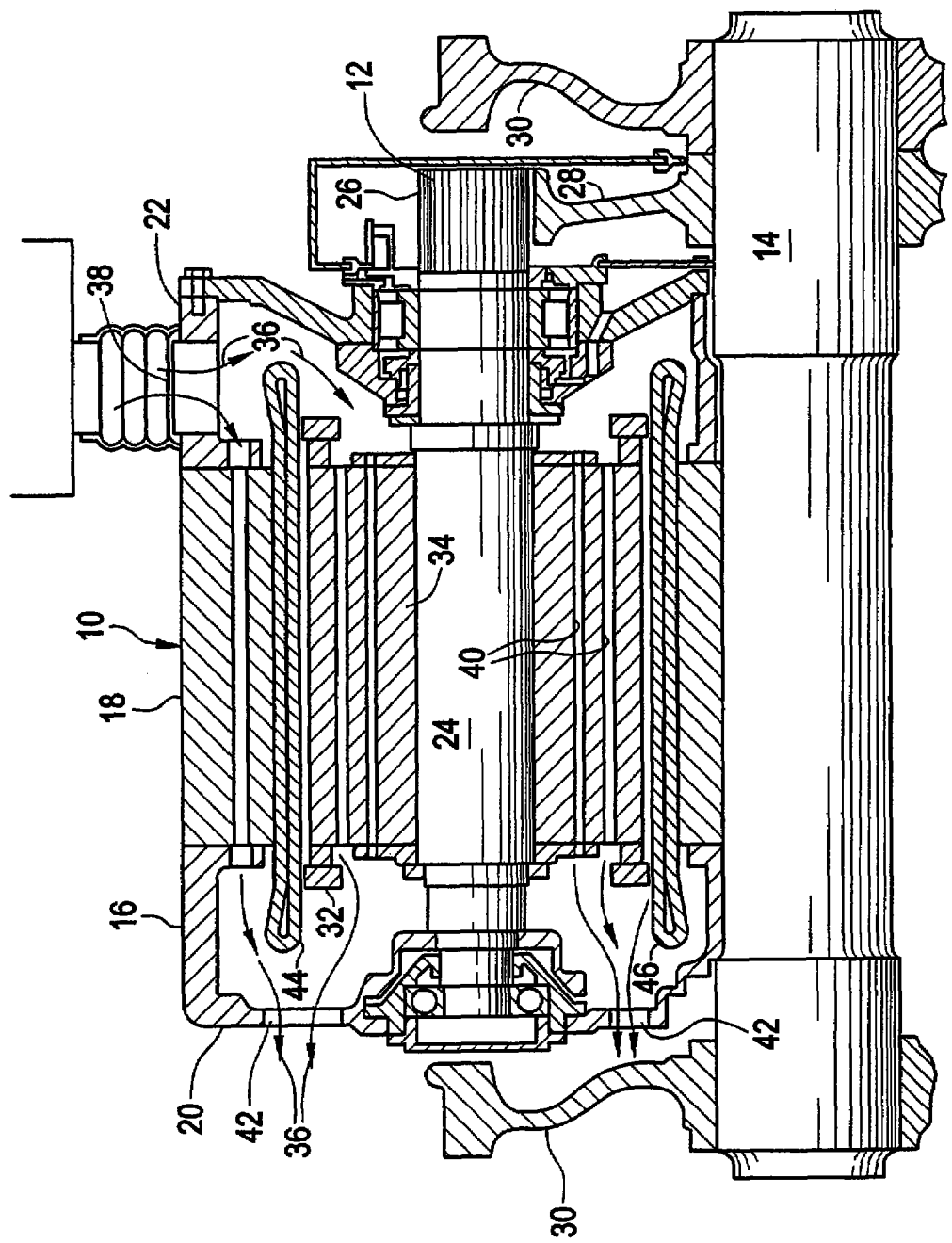
FIG. 1 is a partial cross-sectional view of a prior art locomotive drive system.
Figure 2:
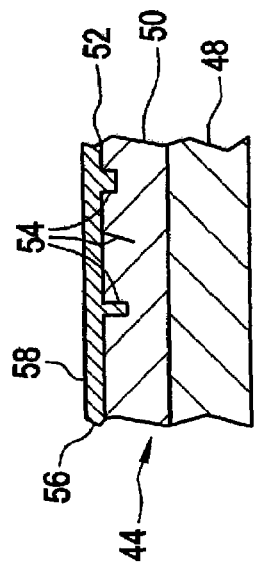
FIG. 2 is a partial cross-sectional view of a conducting element of an electro-dynamic apparatus coated with a layer of a sealing material.

The present inventors have found that the rate of degradation of insulation in an electro-dynamic apparatus may be retarded or even reversed by the application of a coating of a sealing material over those areas of the insulation subject to degradation. FIG. 2 is a partial cross-sectional view of a conducting element 44 including a conductor 48 covered by a layer of electrical insulation 50. The insulation surface 52 may include a plurality of imperfections 54 such as cracks, crevices and chips that have developed in surface 52 during the operation of the component in which the conducting element 44 is installed. The flawed surface 52 of the conducting element 44, as well as other interior surfaces that may advantageously receive such a coating, is coated with a layer of sealing material 56 that will at least cover, and in some cases actually penetrate, the imperfections 54. The term sealing material is used herein to include any material that may be applied in a fluid state to cure, dry or otherwise transform to a solid state to create an essentially continuous layer of material over a target surface. The inventors have found that a rubberized RTV material works well as a sealing material 56 in this application. When applied to degraded areas of the insulation 50, the sealing material 56 provides improved insulation performance in several synergistic ways. First, the coating of sealing material 56 provides a mechanical shield so that small debris particles are less likely to chip the underlying insulation 50. Further, the sealing material 56 acts as a non-stick surface. Particles that adhere to the surface contribute to development of tracking. The somewhat more resilient surface 58 of the sealing material 56 when compared to the harder surface of the insulation is less susceptible to having debris particles become sufficiently embedded to adhere to the surface. The coating of sealing material 56 also improves insulation performance because it acts as a waterproofing material. Because moisture can reduce electrical resistance, the layer of sealing material 56 will improve the performance of the insulation 50 by keeping moisture away from the insulation surface 52 and any flaw 54 therein. Finally, the coating of sealing material 56 is itself an electrically insulating material and therefore it essentially reinforces the insulating function of the underlying insulation system 50.

Figure 3:
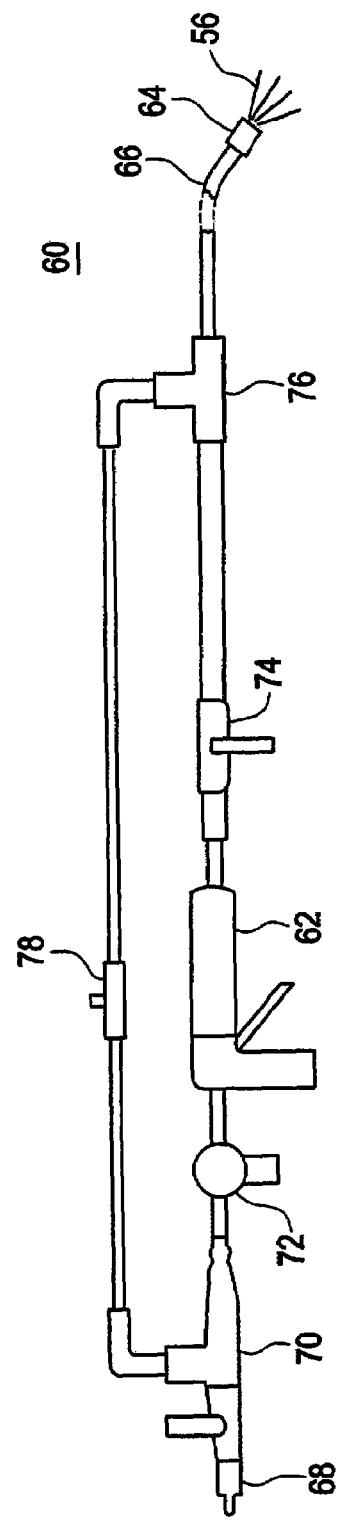
FIG. 3 is a plan view of a sprayer used to service an electro-dynamic apparatus.
Figure 4:
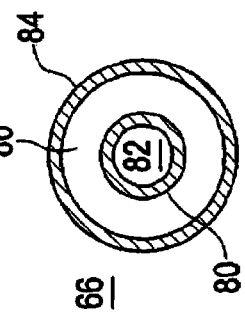
FIG. 4 is an end view of the spray nozzle of the sprayer of FIG. 3.

The application of a coating of a sealing material 56 to a conducting element 44 of an electro-dynamic apparatus 10 in order to extend the operating life of the apparatus 10 is complicated by the geometry of the components involved. Only restricted access may be available to portions of the conducting elements 44, such as through the access openings 42 in the frame head 20 of motor 10. Furthermore, only a portion of the degraded areas of the insulation 50 may be in line-of-sight with the available access openings 42, while other portions may be located on remotes sides of the conducting element 44 not directly within a line-of-sight of the access openings 42. To address this situation, the present inventors have developed a servicing technique that provides for the deposition of a layer of sealing material 56 to the conducting element 44 using a spraying process. A spraying device 60 that may be used in this process is illustrated in FIG. 3. The spraying device 60 includes a reservoir 62 for the sealing material 56 and a nozzle 64 for directing a spray of sealing material 56 from the reservoir 62. The nozzle 64 is connected to the reservoir 62 at least in part by a flexible hose such as delivery tube 66. A source of compressed gas such as compressed air is connected to fitting 68 that is, in turn, connected to a T-fitting 70 for splitting the compressed air into two flow paths. A pressure regulator 72 delivers a first flow of compressed air to the reservoir 62 at a selected and regulated pressure to force a flow of sealing material 56 toward the nozzle 64 through an on-off valve 74 and T-fitting 76. A second flow of compressed air is to T-fitting 76 from T-fitting 70 through flow control valve 78. T-fitting 76 has internal passages (not shown) that maintain the flow of sealing material 56 and the second flow of compressed air separated for delivery to the delivery tube 66. The cross-section of delivery tube 66 can be seen in FIG. 4. Delivery tube 66 is formed of an inner tube 80 defining a first fluid passage 82 and an outer 84 tube having a diameter larger than a diameter of the inner tube surrounding the inner tube 80 to define a second fluid passage 86 in an annular space around the inner tube 80. The sealing material passes through the first fluid passage 82 and the second flow of compressed air passes through the second fluid passage 86 for delivery to nozzle 64. At the discharge end of nozzle 64 the sealing material 56 is forced through an opening by the pressure of the first flow of compressed air being applied to the reservoir 62. The sealing material 56 is then entrained within and accelerated by the second flow of compressed air that is also being discharged from the discharge end of nozzle 64, thereby creating a spray of sealing material 56. The concentric arrangement of the passages 82, 86 provides a reduced size when compared to an arrangement that utilizes two non-concentric tubes, thus facilitating the insertion of a portion of the flexible delivery tube 66 into the interior of the motor 10 together with the nozzle 64.

One will appreciate that a rubberized RTV material has a relatively high viscosity and is thus not easily sprayed. However, the spraying device 60 of FIG. 3 provides for the separate control of the pressure being supplied to the reservoir 62 by pressure regulator 72 and the flow rate of the second flow of compressed air as controlled by flow control valve 78. These controls along with the design selection of the relative sizes of passages 82, 86 and the design of the discharge end of nozzle 64 facilitate the achievement of a desired spray of the high viscosity coating material 56.

A method of servicing an electro-dynamic apparatus may thus be accomplished without disassembling the apparatus and with the apparatus in its normal operational position by inserting the outlet nozzle 64 through at least one of the access openings 42 and directing a spray of sealing material 56 from the outlet nozzle 64 onto a portion of the surface 52 of a conducting element 44. The flexible delivery tube 66 allows the nozzle 64 to be maneuvered around some of the obstructions that may exist within the motor frame 16. Once the nozzle 64 is proximate the target area of conducting element 44, the sealing material 56 may be sprayed directly from the nozzle 64 onto a first portion of the electrical insulation 50 that is in a line of sight with the outlet nozzle. The compressed air of the spray provides a brushing effect that tends to spread the sealing material 56 over the exposed surface. This relatively high viscosity of the sealing material 56 provides a webbing effect when the spray droplets strike the surface. The webbing effect is created because a high viscosity droplet will have a relatively large tail due to the aerodynamic effect of the spraying process. This large tail tends to be whipped as the droplet strikes a hard surface, and the result is that the coverage of the sealing material 56 is broadened. Additionally, an over spray of sealing material 56 may be applied onto a second portion of the electrical insulation 50 that is not within a line of sight with the outlet nozzle 64. Because the spraying device 60 is capable of creating a relatively fine mist of the highly viscous sealing material 56, it is possible to coat surfaces that are out of the line of sight due to the wind tunneling effect as the spray passes an obstruction that pulls the mist around corners to coat hidden surfaces.

The portion of the electrical insulation 50 to be sprayed may be cleaned prior to the step of applying the layer of sealing material 56. Spraying device 60 or a cleaning device having a similar design may be inserted through the access opening 42 as part of the cleaning process, with the material being supplied from the reservoir 62 being a cleaning fluid.

The extent of coverage that may be achieved by the process described above may vary depending upon the particular geometry of the electro-dynamic apparatus being serviced. For a typical locomotive traction motor, the present inventors have found that a majority of the exposed portion of the stator coil end turns can be successfully coated with the sealing material 56, including areas that are not within a line of sight of an access opening. In some applications, material has been sprayed over as much as 3200 of the possible 360° circumference of the apparatus being serviced. In many applications, the areas that can be coated include the areas that are most likely to be degraded as a result of service-induced damage. For example, for the locomotive traction motor 10, the exposed portion of conducting elements 46 that are nearest to the access openings 42 are most likely to be the areas that are the most severely damaged by dirt and small stones that are propelled into the interior of the motor 10 by the action of the wheels 30. Thus, the useful operating life of the motor 10 may be increased by servicing the motor 10 in accordance with the process described above, since it is likely that all or a large percentage of the potentially damaged areas of the insulation 50 can be coated with a sealing material 56 without disassembly of the motor 10. It is expected that a significant reduction in the amount of tracking can be achieved even on surfaces that can not be properly cleaned and where there is only an over spray coating of the sealing material 56. Thus, for the application of a locomotive traction motor 10 where there is a rigorous operating environmental, the process described herein may be scheduled as a routine maintenance service that can be performed prior to any other repair or maintenance that necessitates the removal of the motor 10 from its operating position in the locomotive and prior to any other scheduled disassembly of the motor 10. Importantly, this service may be provided as a preventative maintenance service in response to an inspection of the traction motor detecting electrical tracking across the surface or an accumulation of dirt on the surface of the insulation. Alternatively, the service may be performed on a routine schedule that preempts such problems.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A maintenance service comprising:
    inserting a nozzle through an access opening of a frame of an electro-dynamic apparatus without disassembling the apparatus; and
    directing a spray of a sealing material from the nozzle onto an interior surface of an electrical insulation within the apparatus.

2. The maintenance service of claim 1, further comprising:
    coating an interior surface of the insulation in a line of sight with the access opening with a direct spray from the nozzle; and
    coating an interior surface of the insulation not in a line of sight with the access opening with an over spray from the nozzle.

3. The maintenance service of claim 1, further comprising:
    connecting a flexible hose to the nozzle;
    inserting at least a portion of the flexible hose and the nozzle through the access opening; and
    delivering the sealing material to the nozzle through the flexible hose.

4. The maintenance service of claim 1, further comprising connecting a delivery tube to the nozzle for delivering the sealing material to the nozzle, the delivery tube comprising:
    a first tube defining a first fluid passage and a second tube having a diameter larger than a diameter of the first tube and surrounding the first tube to define a second fluid passage in an annular space around the first tube; and
    directing the sealing material to the nozzle through a first of the first fluid passage and the second fluid passage and directing a compressed gas to the outlet nozzle through a second of the first fluid passage and the second fluid passage to direct the spray of sealing material from the nozzle.

5. The maintenance service of claim 1, wherein the interior surface comprises electrical insulation, and further comprising selecting the sealing material to have a hardness when fully hardened that is less than a hardness of the electrical insulation.

6. The maintenance service of claim 5, further comprising selecting the sealing material to comprise a rubberized material.

7. The maintenance service of claim 1, further comprising cleaning the interior surface prior to the step of directing.

8. The maintenance service of claim 1, further comprising performing the steps of inserting and directing prior to disassembly of the apparatus.

9. The maintenance service of claim 1, further comprising performing the steps of inserting and directing prior to removing the apparatus from its operational location.

10. The maintenance service of claim 1, wherein the electro-dynamic apparatus is a traction motor of a locomotive, and further comprising spraying the sealing material from the nozzle onto a stator portion of the motor.

11. The maintenance service of claim 1, wherein the electro-dynamic apparatus is an alternator of a locomotive, and further comprising spraying the sealing material from the nozzle onto a bus bar of the alternator.

12. A maintenance service for a traction motor of a locomotive, the maintenance service comprising:
   providing a spraying device for delivering a spray of a sealing material from a nozzle;
   inserting the nozzle into an access opening in the traction motor with the traction motor in its normal operational position in the locomotive without removing the traction motor from the locomotive and without disassembly of the traction motor; and
   directing the spray of sealing material from the nozzle onto a surface of electrical insulation of a stator conductor element in an interior of the traction motor.

13. The maintenance service of claim 12, further comprising cleaning the surface of electrical insulation prior to the step of directing the spray of sealing material.

14. The maintenance service of claim 12, further comprising performing the steps of claim 12 as a preventative maintenance service in response to an inspection of the traction motor.

15. A maintenance service for an alternator of a locomotive, the maintenance service comprising:
   providing a spraying device for delivering a spray of a sealing material from a nozzle;
   inserting the nozzle into an access opening in the alternator without removing the alternator from its normal operating position in the locomotive and without disassembly of the alternator; and
   directing the spray of sealing material from the nozzle onto a surface of electrical insulation of a conductor element in an interior of the alternator.

16. The maintenance service of claim 15, further comprising cleaning the surface of electrical insulation prior to the step of directing the spray of sealing material.

17. The maintenance service of claim 15, further comprising performing the steps of claim 12 as a preventative maintenance service in response to an inspection of the alternator.

* * * * *